(12) United States Patent
Yin et al.

(10) Patent No.: US 11,081,885 B2
(45) Date of Patent: Aug. 3, 2021

(54) BATTERY ENERGY STORAGE GRID-LOAD INTERACTIVE METHOD, TERMINAL, SYSTEM AND MEDIUM FOR SUPERIMPOSED CONTROL

(71) Applicants: STATE GRID JIANGSU ELECTRIC POWER CO., LTD, Jiangsu (CN); JIANGSU FRONTIER POWER TECHNOLOGY CO., LTD., Jiangsu (CN)

(72) Inventors: Jijun Yin, Jiangsu (CN); Yong Xia, Jiangsu (CN); Xiaofeng Wang, Jiangsu (CN); Yaohong Li, Jiangsu (CN); Xiao Lu, Jiangsu (CN); Jianyu Luo, Jiangsu (CN); Jinhu Wang, Jiangsu (CN); Zhenyu Chen, Jiangsu (CN); Haifeng Li, Jiangsu (CN); Chengliang Wang, Jiangsu (CN); Jie Fan, Jiangsu (CN); Cheng Li, Jiangsu (CN); Hongxing Wang, Jiangsu (CN); Yujun Lu, Jiangsu (CN); Hao Chen, Jiangsu (CN); Jiajia Cao, Jiangsu (CN); Ning Wang, Jiangsu (CN); Yonggao Ge, Jiangsu (CN)

(73) Assignees: STATE GRID JIANGSU ELECTRIC POWER CO., LTD.; JIANGSU FRONTIER POWER TECHNOLOGY CO., LTD.

( * ) Notice: Subject to any disclaimer, the term of this patent is extended or adjusted under 35 U.S.C. 154(b) by 246 days.

(21) Appl. No.: 16/374,029

(22) Filed: Apr. 3, 2019

(65) Prior Publication Data
US 2020/0251904 A1    Aug. 6, 2020

(30) Foreign Application Priority Data
Feb. 1, 2019    (CN) .......................... 201910103474.1

(51) Int. Cl.
*H02J 3/32* (2006.01)
*G05B 19/042* (2006.01)
*H02J 7/00* (2006.01)

(52) U.S. Cl.
CPC .............. *H02J 3/32* (2013.01); *G05B 19/042* (2013.01); *H02J 7/0068* (2013.01); *G05B 2219/2639* (2013.01)

(58) Field of Classification Search
CPC .. H02J 3/32; H02J 7/0068; H02J 13/00; H02J 2310/60; G05B 19/042; G05B 2219/2639; G05B 19/0426; Y04S 10/50; Y02E 40/70
See application file for complete search history.

(56) References Cited

U.S. PATENT DOCUMENTS

| 2013/0193768 A1* | 8/2013 | Iwasaki | ..................... H02J 7/35 307/85 |
| 2014/0152097 A1* | 6/2014 | Kitaji | ....................... H02J 1/10 307/19 |

(Continued)

FOREIGN PATENT DOCUMENTS

| CN | 107453380 A | 12/2017 |
| CN | 107703926 A | 2/2018 |

(Continued)

OTHER PUBLICATIONS

English Translation of International Search Report dated Oct. 16, 2019; International Patent Application No. PCT/CN2019/077322 filed on Mar. 7, 2019; ISA/CN.

*Primary Examiner* — Thomas C Lee
*Assistant Examiner* — Michael Tang
(74) *Attorney, Agent, or Firm* — McDonald Hopkins LLC

(57) ABSTRACT

Provided is a battery energy storage grid-load interactive method, terminal, system and medium for superimposed control. The method includes: receiving, by the battery energy storage grid-load interactive terminal, a load shedding instruction sent by a master station; sending, by the battery energy storage grid-load interactive terminal, the load shedding instruction to the power conversion system to enable the power conversion system to switch the operating state of the power conversion system from a charging state or a standby state or a discharging state to a maximum power discharging state according to the load shedding instruction; and sending, by the battery energy storage grid-load interactive terminal, the load shedding instruction to the energy managing system to enable the energy managing system to control the power conversion system.

11 Claims, 4 Drawing Sheets

(56) References Cited

U.S. PATENT DOCUMENTS

| | | | |
|---|---|---|---|
| 2014/0239964 A1* | 8/2014 | Gach | G01R 31/36 |
| | | | 324/433 |
| 2015/0066231 A1* | 3/2015 | Clifton | H02J 3/38 |
| | | | 700/296 |
| 2015/0244173 A1* | 8/2015 | Nomura | H02J 7/0068 |
| | | | 307/32 |
| 2016/0204691 A1* | 7/2016 | Okuda | H02M 7/5395 |
| | | | 363/55 |
| 2016/0322846 A1* | 11/2016 | Satake | H02J 7/34 |
| 2018/0041072 A1* | 2/2018 | Clifton | H02J 15/00 |
| 2019/0157877 A1* | 5/2019 | Nakamura | H02J 13/0075 |
| 2019/0199095 A1* | 6/2019 | Kim | H02J 7/0013 |
| 2020/0280191 A1* | 9/2020 | Lee | H02J 3/38 |

FOREIGN PATENT DOCUMENTS

| | | |
|---|---|---|
| CN | 108199400 A | 6/2018 |
| WO | 2015111144 A1 | 7/2015 |

\* cited by examiner

BATTERY ENERGY STORAGE GRID-LOAD INTERACTIVE METHOD, TERMINAL, SYSTEM AND MEDIUM FOR SUPERIMPOSED CONTROL

CROSS-REFERENCE TO RELATED APPLICATIONS

This application claims priority to a Chinese patent application No. 201910103474.1 filed on Feb. 1, 2019, the disclosure of which is incorporated herein by reference in its entirety.

TECHNICAL FIELD

Embodiments of the present disclosure relate to the technical field of intelligent control of power systems, and particularly relate to a battery energy storage grid-load interactive method, terminal, system and medium for superimposed control.

BACKGROUND

A battery energy storage system (BESS) plays an important role in promoting large-scale grid connection of renewable energy, realizing peak shaving and valley filling, regulating peak and frequency and load demand response regulation, improving power supply reliability of micro grid, reducing power consumption cost of users and realizing uninterrupted power supply for loads.

In communication with an energy managing system (EMS) or a power conversion system (PCS), delay during communication between a terminal and the PCS will increase with the number of the PCS due to existence of transmission delay during EMS/PCS communication, which is difficult to satisfy the standard requirement of rapid source-grid-load control. In addition, in communication between the terminal and the PCS, on one hand, the breakdown of part of the PCS may cause communication interruption; on the other hand, the PCS cannot consider battery pack overload and PCS abnormality caused by load shedding at the same time.

SUMMARY

Embodiments of the present disclosure provide a battery energy storage grid-load interactive method, terminal, system and medium for superimposed control.

In a first aspect, embodiments of the present disclosure provide a battery energy storage grid-load interactive method for superimposed control, applied to a battery energy storage grid-load interactive terminal and a battery energy storage system, wherein the battery energy storage system includes an energy managing system, at least one power conversion system, at least one battery managing system in one-to-one correspondence to the power conversion system, and a battery pack; and the method includes:

receiving, by the battery energy storage grid-load interactive terminal, a load shedding instruction sent by a master station;

sending, by the battery energy storage grid-load interactive terminal, the load shedding instruction to the power conversion system so that the power conversion system switches an operating state of the power conversion system from a charging state or a standby state or a discharging state to a maximum power discharging state according to the load shedding instruction; and sending, by the battery energy storage grid-load interactive terminal, the load shedding instruction to the energy managing system so that the energy managing system controls the power conversion system.

In an embodiment, the energy managing system controls the power conversion system in one of the following manners:

controlling, by the energy managing system, the operating state of the power conversion system to switch from the maximum power discharging state to an optimal power discharging state;

acquiring, by the energy managing system, the power conversion system which fails to switch the operating state, and controlling the operating state of the power conversion system which fails to switch the operating state from the charging state or the standby state or the discharging state to the maximum power discharging state; and maintaining, by the energy managing system, the operating state of the power conversion system unchanged.

In an embodiment, the method further includes:

receiving, by the battery energy storage grid-load interactive terminal, a load recovery instruction sent by the master station; and sending, by the battery energy storage grid-load interactive terminal, the load recovery instruction to the energy managing system so that the energy managing system controls the power conversion system to switch from a current operating state to the charging state or the standby state or the discharging state.

In an embodiment, if the energy managing system does not receive the load recovery instruction sent by the battery energy storage grid-load interactive terminal within preset time, the energy managing system controls the power conversion system to switch from the current operating state to the charging state or the standby state or the discharging state.

In a second aspect, embodiments of the present disclosure further provide a battery energy storage grid-load interactive terminal, including: an instruction receiving module, an instruction sending module and an instruction transferring module.

The instruction receiving module is configured to receive a load shedding instruction sent by a master station;

The instruction sending module is configured to send the load shedding instruction to the power conversion system so that the power conversion system switches an operating state of the power conversion system from a charging state or a standby state or a discharging state to a maximum power discharging state according to the load shedding instruction; and The instruction transferring module is configured to send the load shedding instruction to the energy managing system so that the energy managing system controls the power conversion system.

In an embodiment, the instruction receiving module is further configured to receive a load recovery instruction sent by the master station.

The instruction transferring module is further configured to send the load recovery instruction to the energy managing system so that the energy managing system controls the power conversion system to switch from a current operating state to the charging state or the standby state or the discharging state.

In a third aspect, embodiments of the present disclosure further provide a battery energy storage grid-load interactive system for superimposed control. The battery energy storage grid-load interactive system for superimposed control includes the battery energy storage grid-load interactive terminal described in the second aspect, and a battery energy storage system.

The battery energy storage system includes an energy managing system, at least one power conversion system, at least one battery managing system in one-to-one correspondence to the power conversion system, and a battery pack.

In a fourth aspect, embodiments of the present disclosure also provide a computer readable storage medium, storing a computer program, wherein the computer program, when executed by a processor, implements the battery energy storage grid-load interactive method for superimposed control described in any embodiment of the first aspect.

The battery energy storage grid-load interactive method provided by embodiments of the present disclosure includes: receiving, by the battery energy storage grid-load interactive terminal, a load shedding instruction sent by the master station; sending, by the battery energy storage grid-load interactive terminal, the load shedding instruction to the power conversion system so that the power conversion system switches an operating state of the power conversion system from a charging state or a standby state or a discharging state to a maximum power discharging state according to the load shedding instruction; and sending, by the battery energy storage grid-load interactive terminal, the load shedding instruction to the energy managing system so that the energy managing system controls the power conversion system. The battery energy storage grid-load interactive terminal directly sends the load shedding instruction to the power conversion system, so that the power conversion system switches the operating state of the power conversion system from a charging state or a standby state or a discharging state to a maximum power discharging state at highest speed according to the load shedding instruction, ensuring a minimum delay of state switch. The battery energy storage grid-load interactive terminal sends the load shedding instruction to the energy managing system so that the energy managing system controls the power conversion system, thereby realizing safe management of source-grid-load control.

BRIEF DESCRIPTION OF DRAWINGS

To more clearly describe the embodiments of the present disclosure, the drawings to be used in description of the embodiments of the present disclosure will be simply presented below. Apparently, the drawings in the following description are merely some embodiments of the present disclosure, and for those ordinary skilled in the art, other drawings can also be obtained according to the contents of embodiments of the present disclosure and these drawings without contributing creative labor.

DETAILED DESCRIPTION

The present disclosure will be described below in further detail in combination with drawings and embodiments. It can be understood that specific embodiments described herein are only used for explaining the present disclosure, not used for limiting the present disclosure. In addition, it should be noted that for ease of description, drawings only show some structures related to the present disclosure rather than all structures.

Figure 1:
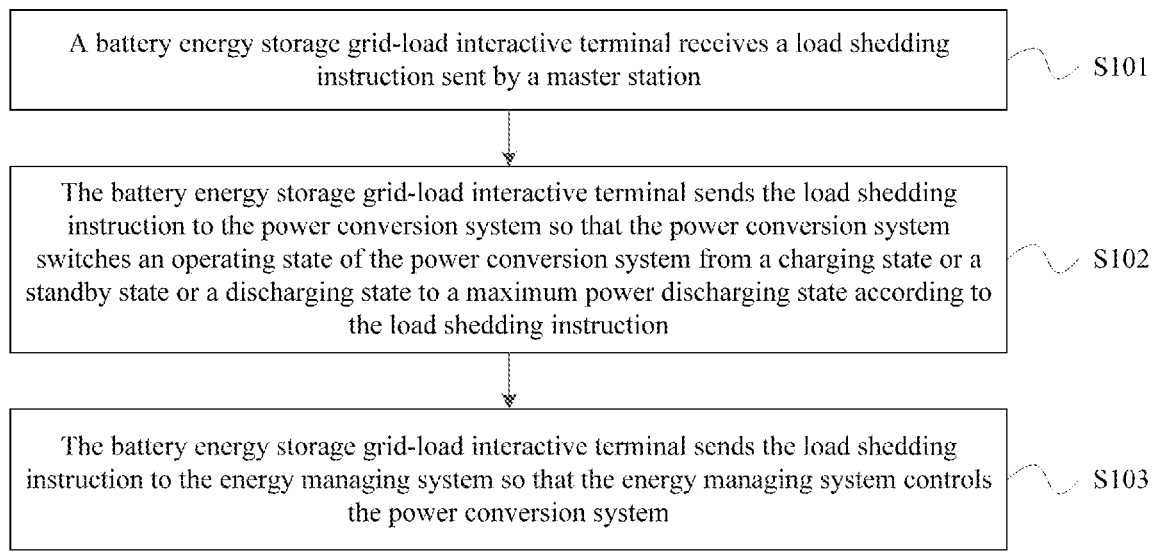
FIG. 1 is a flow chart illustrating a battery energy storage grid-load interactive method for superimposed control provided by an embodiment of the present disclosure.

Embodiments of the present disclosure provide a battery energy storage grid-load interactive method for superimposed control. FIG. 1 is a flow chart illustrating a battery energy storage grid-load interactive method for superimposed control provided by an embodiment of the present disclosure. The method is applied to a battery energy storage grid-load interactive terminal and a battery energy storage system. The battery energy storage system includes an energy managing system, at least one power conversion system, at least one battery managing system in one-to-one correspondence to the power conversion system, and a battery pack. By referring to FIG. 1, the method includes steps described below.

In step S101, the battery energy storage grid-load interactive terminal receives a load shedding instruction sent by a master station.

Specifically, by means of rapid switching capabilities of "charging to discharging" and "heat-energy-standby to discharging" of the battery energy storage system, energy storage source-grid-load control is implemented, and effects of reducing energy storage charging load during grid fault and providing an additional power support are achieved at the same time, thereby providing more supports for stability of grid frequency. When a grid fails or the load changes, the master station sends the load shedding instruction to the battery energy storage grid-load interactive terminal and the battery energy storage grid-load interactive terminal receives the load shedding instruction sent by the master station through an interface between the battery energy storage grid-load interactive terminal and the master station.

In step S102, the battery energy storage grid-load interactive terminal sends the load shedding instruction to the power conversion system so that the power conversion system switches an operating state of the power conversion system from a charging state or a standby state or a discharging state to a maximum power discharging state according to the load shedding instruction.

Specifically, an output interface of the battery energy storage grid-load interactive terminal is connected with an input of the PCS. The battery energy storage grid-load interactive terminal may send the load shedding instruction to the PCS through the output interface. The PCS rapidly responds to the load shedding instruction of the battery energy storage grid-load interactive terminal according to the received load shedding instruction to switch from the charging state or the standby state or the discharging state to the maximum power discharging state. Exemplarily, when the battery energy storage grid-load interactive terminal receives the load shedding instruction sent by the master station, the output is controlled rapidly. After the PCS receives the load shedding instruction, the PCS immediately switches from the charging state or the standby state or the discharging state to the maximum power discharging state, thereby ensuring that the load shedding instruction of the battery energy storage grid-load interactive terminal is transmitted to the PCS at highest speed, realizing minimum conversion delay from the charging state or the standby state or the discharging state to the maximum power discharging state and satisfying the requirement of rapidity of load shedding for the source-grid-load system.

In step S103, the battery energy storage grid-load interactive terminal sends the load shedding instruction to the energy managing system so that the energy managing system controls the power conversion system.

Specifically, the battery energy storage grid-load interactive terminal is connected with the EMS through a communication interface. The battery energy storage grid-load interactive terminal sends the load shedding instruction to the EMS. After the EMS receives the load shedding instruction, the EMS controls the PCS. Exemplarily, the battery energy storage grid-load interactive terminal sends the load shedding instruction to the EMS through the communication interface. After the EMS receives the load shedding instruction, the EMS sets the energy storage system to a source-grid-load control state. The EMS detects the real-time conditions of the battery management system (BMS) and the PCS, and controls the PCS for regulation in real time according to the detected conditions of the BMS and the PCS. The battery energy storage grid-load interactive terminal sends the load shedding instruction to the energy managing system so that the energy managing system controls the power conversion system, thereby realizing safe management of the source-grid-load control.

In the battery energy storage grid-load interactive method provided by embodiments of the present disclosure, the battery energy storage grid-load interactive terminal receives the load shedding instruction sent by the master station; sends the load shedding instruction to the power conversion system so that the power conversion system switches an operating state of the power conversion system from a charging state or a standby state or a discharging state to a maximum power discharging state according to the load shedding instruction; and sends the load shedding instruction to the energy managing system so that the energy managing system controls the power conversion system. The battery energy storage grid-load interactive terminal directly sends the load shedding instruction to the power conversion system, so that the power conversion system switches the operating state of the power conversion system from a charging state or a standby state or a discharging state to a maximum power discharging state at highest speed according to the load shedding instruction, ensuring a minimum delay of state switch. The battery energy storage grid-load interactive terminal sends the load shedding instruction to the energy managing system so that the energy managing system controls the power conversion system, thereby realizing safe management of source-grid-load control.

In an embodiment, the energy managing system controls the power conversion system in one of the following manners: the energy managing system controls the operating state of the power conversion system to switch from the maximum power discharging state to an optimal power discharging state; the energy managing system acquires the power conversion system which fails to switch the operating state, and controls the operating state of the power conversion system which fails to switch the operating state from the charging state or the standby state or the discharging state to the maximum power discharging state; and the energy managing system maintains the operating state of the power conversion system unchanged.

Specifically, the energy managing system controls the power conversion system as described below. In an embodiment, the battery energy storage grid-load interactive terminal sends the load shedding instruction to the EMS; after the EMS obtains a control right, the EMS sets the battery energy storage system to the source-grid-load control state; after the battery energy storage system enters the source-grid-load control state, the EMS actively manages the power control of the PCS; the EMS implements instruction resending, economic power generation and safe operation according to the PCS and a battery pack state, and controls the operating state of the PCS to switch from the maximum power discharging state to the optimal power discharging state so that the PCS enters a more ideal operating state. In another embodiment, when the battery energy storage grid-load interactive terminal fails to directly control the switch of the operating state of the PCS, i.e., when the PCS fails to receives the load shedding instruction sent by the battery energy storage grid-load interactive terminal or fails to switch after receiving the load shedding instruction, the EMS acquires the operating state of the PCS in real time through serial communication, acquires the operating state information of the PCS which fails to switch the operating state, resends the load shedding instruction to the PCS and controls the PCS to switch from the charging state or the standby state or the discharging state to the maximum power discharging state. The EMS regulates discharging power outputted by the PCS with respect to the states of the PCS and the corresponding battery pack, so that the energy storage system operates in the optimal economic power mode. The EMS can control a single PCS to operate with reduced discharging power or exit the source-grid-load control according to the PCS abnormalities, battery pack overload, SOC low charge and other abnormal phenomena. In another embodiment, when the operating state of the PCS acquired by the EMS in real time is consistent with the acquired load shedding instruction of the battery energy storage grid-load interactive terminal, the EMS controls the PCS to keep the current operating state unchanged.

Specifically, when the battery energy storage grid-load interactive terminal receives the load shedding instruction sent by the master station, the output is controlled rapidly. After the PCS receives the load shedding instruction, the PCS immediately switches from the charging state or the standby state or the discharging state to the maximum power discharging state, thereby ensuring that the load shedding instruction of the battery energy storage grid-load interactive terminal is sent to the PCS at highest speed, realizing minimum conversion delay of the PCS from the charging state or the standby state to the maximum power discharging state and satisfying the requirement of rapidity of load shedding for the source-grid-load system. The battery energy storage grid-load interactive terminal sends the load shedding instruction to the EMS. After the EMS obtains a control right, the EMS controls the operating state of the PCS to switch from the maximum power discharging state to the optimal power discharging state so that the PCS enters a more ideal operating state.

Figure 2:
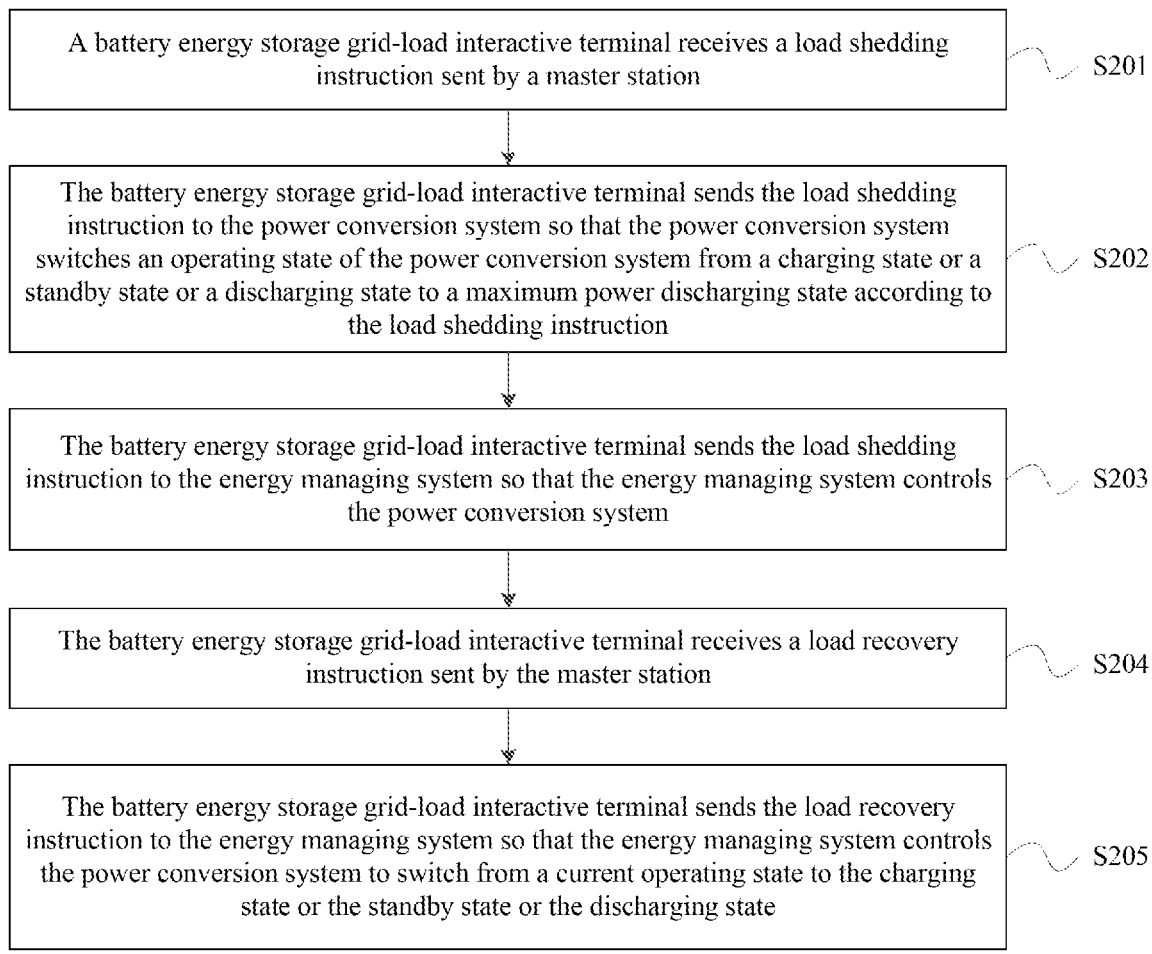
FIG. 2 is another flow chart illustrating a battery energy storage grid-load interactive method for superimposed control provided by an embodiment of the present disclosure.

In an embodiment, FIG. 2 is another flow chart illustrating a battery energy storage grid-load interactive method for superimposed control provided by an embodiment of the present disclosure. By referring to FIG. 2, the method includes steps described below.

In step S201, a battery energy storage grid-load interactive terminal receives a load shedding instruction sent by a master station.

In step S202, the battery energy storage grid-load interactive terminal sends the load shedding instruction to the power conversion system so that the power conversion system switches an operating state of the power conversion system from a charging state or a standby state or a discharging state to a maximum power discharging state according to the load shedding instruction.

In step S203, the battery energy storage grid-load interactive terminal sends the load shedding instruction to the energy managing system so that the energy managing system controls the power conversion system.

In step S204, the battery energy storage grid-load interactive terminal receives a load recovery instruction sent by the master station.

Specifically, when the grid fault is relieved, the master station sends the load recovery instruction to the battery energy storage grid-load interactive terminal, and the battery energy storage grid-load interactive terminal receives the load recovery instruction sent by the master station through an interface with the master station.

In step S205, the battery energy storage grid-load interactive terminal sends the load recovery instruction to the energy managing system so that the energy managing system controls the power conversion system to switch from a current operating state to the charging state or the standby state or the discharging state.

Specifically, when the battery energy storage grid-load interactive terminal receives the load recovery instruction sent by the master station, the battery energy storage grid-load interactive terminal sends the received load recovery instruction to EMS. After the EMS receives the load recovery instruction, the EMS controls the battery energy storage system to exit the source-grid-load control, and controls the PCS back to the charging state before load shedding, or the standby state or the discharging state.

In an embodiment, if the energy managing system does not receive the load recovery instruction sent by the battery energy storage grid-load interactive terminal within preset time, the energy managing system controls the power conversion system to switch from the current operating state to the charging state or the standby state or the discharging state.

Specifically, the EMS has a built-in load shedding timeout timer that set the time. The EMS communicates with the battery energy storage grid-load interactive terminal through a serial port, so as to transmit the power and state data of the energy storage system, and to receive the load shedding instruction or the load recovery instruction of the battery energy storage grid-load interactive terminal. When the battery energy storage grid-load interactive terminal does not send the load recovery instruction within preset time, or when the energy managing system does not receive the load recovery command sent by the battery energy storage grid-load interactive terminal within the preset time, the EMS may actively exit the source-grid-load control, ensuring that the PCS gets back to the state before the load shedding. After the battery energy storage system enters the source-grid-load control state, the EMS may be unable to properly receive the load shedding instruction and the load recovery instruction due to loss of the recovery instruction of the master station or communication interruption with the battery energy storage grid-load interactive terminal. To ensure the source-grid-load control of the battery energy storage system, the following strategy may be adopted. The EMS may receive the source-grid-load shedding instruction transmitted by the PCS; and if the load shedding instruction of the battery energy storage grid-load interactive terminal is not received after preset delay time, the EMS automatically enters the source-grid-load control state. Exemplarily, the preset time may be 3 seconds to 7 seconds. Preferably, if the EMS still does not receive the load shedding instruction of the battery energy storage grid-load interactive terminal after delay of 5 seconds, the EMS automatically enters the source-grid-load control state. After the EMS enters the source-grid-load control state, a delay recovery timer is started immediately. When the delay timer exceeds a set recovery time value, the delay recovery timer stops timing and triggers the EMS to exit the source-grid-load control state.

The battery energy storage grid-load interactive method for superimposed control provided by embodiments of the present disclosure enables the energy managing system to control the power conversion system to implement safe management of the source-grid-load control, implements rapid switch of the battery energy storage system from the charging state to the discharging state during load shedding to ensure that the battery energy storage system is operated at largest discharging power target, implements safe control over an energy storage battery, the PCS and other devices during discharging endurance of the battery energy storage system, and ensures that the battery energy storage system after recovery of grid frequency is recovered to the charging state or the standby state or the discharging state before discharge.

Figure 3:
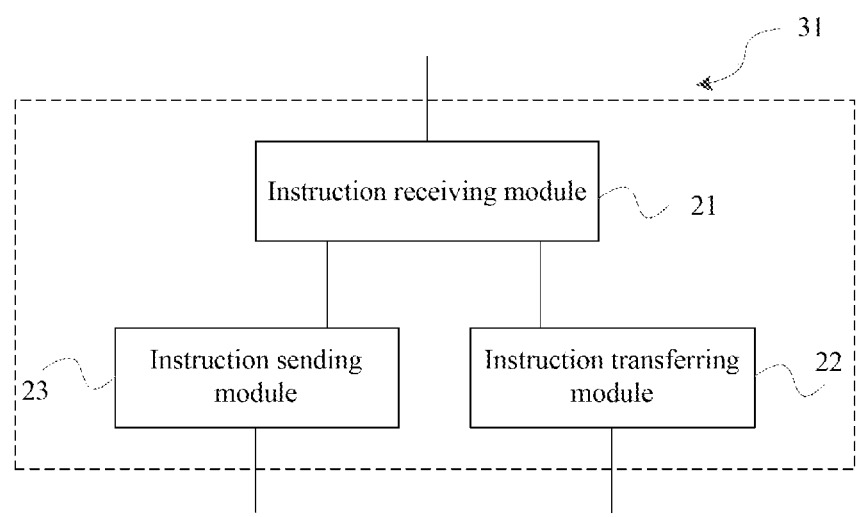
FIG. 3 is a schematic diagram illustrating a battery energy storage grid-load interactive terminal provided by an embodiment of the present disclosure.

Embodiments of the present disclosure provide a battery energy storage grid-load interactive terminal. FIG. 3 is a schematic diagram illustrating a battery energy storage grid-load interactive terminal provided by an embodiment of the present disclosure. By referring to FIG. 3, the battery energy storage grid-load interactive terminal provided by an embodiment of the present disclosure includes an instruction receiving module 21, an instruction sending module 22 and an instruction transferring module 23.

The instruction receiving module 21 is configured to receive a load shedding instruction sent by a master station.

The instruction sending module 22 is configured to send the load shedding instruction to the power conversion system so that the power conversion system switches an operating state of the power conversion system from a charging state or a standby state or a discharging state to a maximum power discharging state according to the load shedding instruction.

The instruction transferring module 23 is configured to send the load shedding instruction to the energy managing system so that the energy managing system controls the power conversion system.

In an embodiment, the instruction receiving module 21 is further configured to receive a load recovery instruction sent by the master station.

The instruction transferring module 23 is further configured to send the load recovery instruction to the energy managing system so that the energy managing system controls the power conversion system to switch from a current operating state to the charging state or the standby state or the discharging state.

The battery energy storage grid-load interactive terminal provided by an embodiment of the present disclosure includes the instruction receiving module, the instruction sending module and the instruction transferring module. The instruction receiving module and the instruction sending module achieve that the load shedding instruction is transmitted to the PCS at highest speed, ensuring that the switching time of the energy storage system from charging to maximum power discharging during load shedding is controlled to about 100 ms, and satisfying the requirement of rapid control over the source-grid-load shedding. The instruction transferring module achieves that the instruction is transferred to the EMS and the EMS can manage and monitor all devices such as the battery pack and the PCS after takeover. This avoids partial battery overload and ultra-low state of charge (SOC) caused possibly by maximum output of the PCS, and implements safe operation and economic (optimal) output of the energy storage system.

In an embodiment, the battery energy storage grid-load interactive terminal has a plurality of network interfaces for communicating with the master station. The network interfaces can support simultaneous communication with a plurality of master station systems of the source-grid-load, so as to implement data collection and load control for the battery energy storage system. The battery energy storage grid-load interactive terminal has a multiple independent output control interfaces which can support independent and simultaneous control over each energy storage PCS and implement simultaneous rapid switch of a plurality of PCS from the charging state or the standby state or the discharging state to the maximum power discharging state, thereby achieving that the complete set of battery energy storage system is discharged at highest power. The battery energy storage grid-load interactive terminal has an interface to communicate with the battery energy storage system, so as to collect multiple data of the battery energy storage system, such as power and PCS state and implement monitoring of the energy storage system.

The battery energy storage grid-load interactive terminal uploads the charging and discharging power and PCS state or fault information of the battery energy storage system to the master station in real time, so that the master station may monitor the state of the energy storage system in real time and adjust the control strategy. The battery energy storage grid-load interactive terminal may also estimate the sheddable load in real time and upload the sheddable load to the master station according to the charging and discharging power of the battery energy storage system and the PCS state, so that the master station may calculate the total sheddable load including a plurality of energy storage systems and industrial users, so as to implement accurate load control. The battery energy storage grid-load interactive terminal may automatically extend the number of slave terminals according to the scale of the energy storage systems and the number of PCS, so as to have an extended control in the form of "1 master+multiple slaves", and adapt to the load control of different scales and different numbers of PCS.

The EMS transmits the data such as the charging and discharging power of the energy storage system and the PCS state to the energy storage grid load terminal. In case of emergency load shedding, the battery energy storage grid-load interactive terminal sends the load shedding instruction to the PCS quickly, realizing the power conversion of the PCS at highest speed. The operating state of the PCS is switched from the charging state or the standby state or the discharging state to the maximum power discharging state, so as to satisfy the time limit requirement for the source-grid-load control.

The energy storage grid load terminal provided by the present embodiment is used for executing the battery energy storage grid-load interactive method for superimposed control provided by any embodiment of the present disclosure, and belongs to the same inventive concept as the battery energy storage grid-load interactive method for superimposed control provided by any embodiment of the present disclosure and has the corresponding beneficial effects. For the technical details not detailed in the present embodiment, see the battery energy storage grid-load interactive method for superimposed control provided by any embodiment of the present disclosure.

Figure 4:
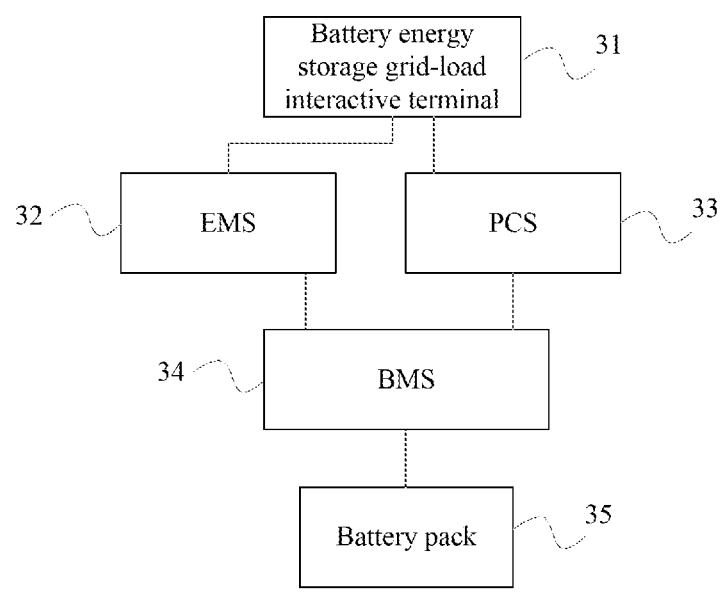
FIG. 4 is a schematic diagram illustrating a battery energy storage grid-load interactive system for superimposed control provided by an embodiment of the present disclosure.

Embodiments the present disclosure provide a battery energy storage grid-load interactive system for superimposed control. FIG. 4 is a schematic diagram illustrating a battery energy storage grid-load interactive system for superimposed control provided by an embodiment of the present disclosure. By referring to FIG. 4, the battery energy storage grid-load interactive system for superimposed control provided by an embodiment of the present disclosure includes the battery energy storage grid-load interactive terminal 31, and a battery energy storage system. The battery energy storage system includes an energy managing system 32, at least one power conversion system 33, at least one battery managing systems 34 in one-to-one correspondence to the power conversion system, and a battery pack 35. FIG. 4 is an example in which the battery energy storage system includes one power conversion system 33.

The battery energy storage grid-load interactive terminal 31 is configured to receive a load shedding instruction sent by a master station and send the load shedding instruction to the power conversion system 33.

The power conversion system 33 is configured to switch an operating state of the power conversion system 33 from a charging state or a standby state or a discharging state to a maximum power discharging state according to the load shedding instruction.

The battery energy storage grid-load interactive terminal 31 is further configured to send the load shedding instruction to the energy managing system 32.

The energy managing system 32 is configured to control the power conversion system 33. Specifically, the battery managing system 34 is configured to collect data of the battery pack 35.

The battery pack 35 is configured to act as an energy storage charging load and provide additional power support.

The battery energy storage grid-load interactive system for superimposed control provided by an embodiment of the present disclosure includes the battery energy storage grid-load interactive terminal and the battery energy storage system. The battery energy storage system includes the energy managing system, at least one power conversion system, at least one battery managing systems in one-to-one correspondence to the power conversion system, and the battery pack. The battery energy storage grid-load interactive terminal of the battery energy storage system of the present disclosure has an interface for communicating with the EMS and an interface for implementing discharge control of the PCS. The current charging and discharging power data, and the operation state information of the PCS and the energy storage system are collected by the EMS. After the load shedding instruction of the master station is received, the PCS is rapidly controlled to implement the maximum power discharge of the energy storage system and provide the maximum power support for the grid. After the load recovery instruction is received, the battery energy storage system can be guaranteed to return to the state before load shedding. The superimposed control of the EMS and the PCS is adopted, thereby achieving that the load shedding instruction is transferred to the PCS at highest speed, ensuring that the switching time of the energy storage system from charging to maximum power discharging during load shedding is controlled to about 100 ms, and satisfying the requirement of rapid control over the source-grid-load shedding. The overall process of load shedding control of the battery energy storage system is managed by the EMS. The EMS may also manage and monitor all devices such as the battery pack and the PCS. This avoids partial battery overload and ultra-low SOC caused possibly by maximum output of the PCS, and implements safe operation and economic (optimal) output of the battery energy storage system.

In an embodiment, the energy managing system 32 is specifically configured to control the operating state of the power conversion system 33 to switch from the maximum power discharging state to the optimal power discharging state; or acquire the power conversion system 33 which fails to switch the operating state, and control the operating state of the power conversion system 33 which fails to switch the operating state from the charging state or the standby state or the discharging state to the maximum power discharging state; or maintain the operating state of the power conversion system 33 unchanged.

In an embodiment, the battery energy storage grid-load interactive terminal 31 is further configured to receive a load recovery instruction sent by the master station and send the load recovery instruction to the energy managing system 32. The energy managing system 32 is further configured to control the power conversion system 33 to switch from a current operating state to the charging state or the standby state or the discharging state.

In an embodiment, if the energy managing system 32 does not receive the load recovery instruction sent by the battery energy storage grid-load interactive terminal 31 within preset time, the energy managing system 32 is further configured to control the power conversion system 33 to switch from the current operating state to the charging state or the standby state or the discharging state.

Specifically, the EMS may have a built-in timeout timer that set the load recovery. Even if the load recovery instruction is lost, the battery energy storage system still can be guaranteed to exit the source-grid-load control. The EMS communicates with the PCS and the BMS to collect the data of the PCS and the battery pack, and implements the control over the PCS and the BMS. The battery energy storage grid-load interactive terminal 31 is designed to have a configuration function that can support an extended terminal. The battery energy storage grid-load interactive terminal 31 may include a master terminal and an extended terminal. Each battery energy storage grid-load interactive terminal 31 supports 18 independent outputs at most, and can realize independent control of 18 PCS. When the number of the PCS exceeds 18, one terminal may be extended. When the number of the PCS exceeds 36, another terminal may be extended. The number of the PCS is matched with the number of terminals and may be increased accordingly, and the battery energy storage grid-load interactive terminal 31 may be connect with 15 extended terminals at most. When the number of the PCS exceeds the number of master terminal interfaces of the battery energy storage grid-load interactive terminal 31, the extended terminals may be configured by setting control word. The master terminal communicates with the extended terminal through GOOSE protocol, thereby ensuring the fastest transmission of a control command. The master terminal sends load shedding control signals of all the PCS through GOOSE. After receiving the control command, the slave terminals controls the output and sends the control command to the PCS to implement rapid response.

The battery energy storage grid-load interactive terminal 31 communicates with the EMS through a RS-485 serial port, which reduces the risk of network attack to the grid load terminal and the energy storage systems. When the EMS does not support the serial port, a serial port module may be extended to support the communication. The battery energy storage grid-load interactive terminal 31 also reserves more than two communication interfaces to communicate with the master station. The communication interfaces may support simultaneous communication with a plurality of master stations through optical fibers or network cables to implement the function of multi-source response. A dedicated encryption device is provided for the network communication between the battery energy storage grid-load interactive terminal 31 and the master station, so as to ensure the encryption of communication message and authentication of device signature, preventing network attack and ensuring the security of source grid-load interactive control of the battery energy storage system.

The battery energy storage grid-load interactive terminal 31 supports the communication with EMS of different manufacturers, adopts a unified communication protocol, and ensures that collected data, a communication point table, a communication rate and a check mode can be configured. The collected data may include current active power, reactive power, PCS working state, PCS abnormal/fault state and other information of the energy storage system. The control data may include the load shedding instruction and the load recovery instruction. This satisfies the need for large energy storage capacity and distributed arrangement of the control terminals, and adapt to the requirements of different scales, different manufacturers and different device layouts.

The battery energy storage grid-load interactive terminal 31 may accurately predict the sheddable load in real time and upload the sheddable load to the master station according to the current power of the energy storage system and the number of controllable PCS, so as to realize the precise load shedding of the master station.

The battery energy storage grid-load interactive terminal 31 is provided with an independently controlled tripping exit matrix for each PCS. When a certain PCS exits or the battery pack fails, the PCS may directly exit from the corresponding control matrix. Meanwhile, the battery energy storage grid-load interactive terminal 31 is also provided with an output control soft strap to ensure that the control of a master station can be responded accurately or not responded.

The battery energy storage grid-load interactive terminal may support the reliable extension of the interfaces according to the capacity scale of the controlled energy storage system and the number of PCS, so as to implement the independent and simultaneous control over each PCS of energy storage, and support the transmission of real-time data of the energy storage system to a plurality of master stations. The battery energy storage grid-load interactive terminal may accept multi-source response control of a plurality of master stations, and may predict the sheddable load of the energy storage system under different working conditions such as charging/standby/discharging, which is beneficial for the master station to accurately calculate the current total sheddable load of the grid and for implementing independent setting and control for each PCS. The control mode may be adjusted according to the device condition of the energy storage system. The output control soft strap is arranged, so as to respond to the control output of the master station, or not to respond to the control of a master station, thereby providing convenience for the test.

The battery energy storage system provided by the present embodiment is used for executing the battery energy storage grid-load interactive method for superimposed control provided by any embodiment of the present disclosure, and belongs to the same inventive concept as the battery energy storage grid-load interactive method for superimposed control provided by any embodiment of the present disclosure and has the corresponding beneficial effects. For the technical details not detailed in the present embodiment, see the battery energy storage grid-load interactive method for superimposed control provided by any embodiment of the present disclosure.

Based on the above embodiments, the present embodiment further provides a computer readable storage medium which stores a computer program. An instruction in the storage medium, when executed by a processor of the battery energy storage grid-load interactive terminal, realizes the battery energy storage grid-load interactive method for superimposed control in any embodiment of the present disclosure. The method includes: the battery energy storage grid-load interactive terminal receives a load shedding instruction sent by a master station; the battery energy storage grid-load interactive terminal sends the load shedding instruction to the power conversion system so that the power conversion system switches an operating state of the power conversion system from a charging state or a standby state or a discharging state to a maximum power discharging state according to the load shedding instruction; and the battery energy storage grid-load interactive terminal sends the load shedding instruction to the energy managing system so that the energy managing system controls the power conversion system.

Of course, the computer readable storage medium including an executable instruction provided by embodiments of the present disclosure can execute the instructions which are not limited to the above operation of the battery energy storage grid-load interactive method for superimposed control, can also execute related operation in the battery energy storage grid-load interactive method for superimposed control provided by any embodiment of the present disclosure, and has corresponding functions and beneficial effects.

Through the above description for embodiments, those skilled in the art can clearly understand that the present disclosure can be achieved by means of software and necessary universal hardware, and of course, can also be achieved through hardware. However, in many cases, the former is a better embodiment. Based on such understanding, the present disclosure can be reflected in a form of a software product in essence or in a part of making a contribution to the related art. The software product can be stored in a readable storage medium, such as a read-only memory (ROM), a random access memory (RAM), a flash and the like of the battery energy storage grid-load interactive terminal, including several instructions to enable one battery energy storage grid-load interactive terminal device to execute the battery energy storage grid-load interactive method for superimposed control in embodiments of the present disclosure.

It should be noted that, the above only describes preferred embodiments of the present disclosure and applied technical principles. Those skilled in the art shall understand that the present disclosure is not limited to specific embodiments described herein. For those skilled in the art, various apparent variations, readjustments and replacements can be made without departing from a protection scope of the present disclosure. Therefore, although the present disclosure is described in detail through the above embodiments, the present disclosure is not limited to the above embodiments and may further include more other equivalent embodiments without departing from the concept of the present disclosure, while the scope of the present disclosure is decided by a scope of attached claims.

What is claimed is:

1. A battery energy storage grid-load interactive method for superimposed control, applied to a battery energy storage grid-load interactive terminal and a battery energy storage system, wherein the battery energy storage system comprises an energy managing system, at least one power conversion system, at least one battery managing system in one-to-one correspondence to the power conversion system, and a battery pack; wherein the method comprises:

receiving, by the battery energy storage grid-load interactive terminal, a load shedding instruction sent by a master station;

sending, by the battery energy storage grid-load interactive terminal, the load shedding instruction to the power conversion system to enable the power conversion system to switch an operating state of the power conversion system from a charging state or a standby state or a discharging state to a maximum power discharging state according to the load shedding instruction; and sending, by the battery energy storage grid-load interactive terminal, the load shedding instruction to the energy managing system to enable the energy managing system to control the power conversion system;

wherein the energy managing system controls the power conversion system in one manner of a group consisting of:

controlling, by the energy managing system, the operating state of the power conversion system to switch from the maximum power discharging state to an optimal power discharging state;

acquiring, by the energy managing system, the power conversion system failing to switch the operating state, and controlling the operating state of the power conversion system failing to switch the operating state from the charging state or the standby state or the discharging state to the maximum power discharging state; and maintaining, by the energy managing system, the operating state of the power conversion system unchanged.

2. The method according to claim 1, further comprising:

receiving, by the battery energy storage grid-load interactive terminal, a load recovery instruction sent by the master station; and sending, by the battery energy storage grid-load interactive terminal, the load recovery instruction to the energy managing system to enable the energy managing system to control the power conversion system to switch from a current operating state to the charging state or the standby state or the discharging state.

3. The method according to claim 2, wherein in response to determining that the energy managing system does not receive the load recovery instruction sent by the battery energy storage grid-load interactive terminal within preset time, the energy managing system controls the power conversion system to switch from the current operating state to the charging state or the standby state or the discharging state.

4. A non-transitory computer readable storage medium, storing a computer program, wherein the computer program, when executed by a processor, implements the battery energy storage grid-load interactive method for superimposed control according to claim 1.

5. The non-transitory computer readable storage medium according to claim 4, wherein the energy managing system controls the power conversion system in one manner of a group consisting of:

controlling, by the energy managing system, the operating state of the power conversion system to switch from the maximum power discharging state to an optimal power discharging state;

acquiring, by the energy managing system, the power conversion system failing to switch the operating state, and controlling the operating state of the power conversion system failing to switch the operating state from the charging state or the standby state or the discharging state to the maximum power discharging state; and maintaining, by the energy managing system, the operating state of the power conversion system unchanged.

6. The non-transitory computer readable storage medium according to claim 4, wherein the battery energy storage grid-load interactive method for superimposed control further comprises:

receiving, by the battery energy storage grid-load interactive terminal, a load recovery instruction sent by the master station; and sending, by the battery energy storage grid-load interactive terminal, the load recovery instruction to the energy managing system to enable the energy managing system to control the power conversion system to switch from a current operating state to the charging state or the standby state or the discharging state.

7. The non-transitory computer readable storage medium according to claim 6, wherein in response to determining that the energy managing system does not receive the load recovery instruction sent by the battery energy storage grid-load interactive terminal within preset time, the energy managing system controls the power conversion system to switch from the current operating state to the charging state or the standby state or the discharging state.

8. A battery energy storage grid-load interactive terminal, comprising:

a processor; and a memory for storing instructions executable by the processor, wherein the processor is configured to:

receive a load shedding instruction sent by a master station;

send the load shedding instruction to the power conversion system to enable the power conversion system to switch an operating state of the power conversion system from a charging state or a standby state or a discharging state to a maximum power discharging state according to the load shedding instruction; and send the load shedding instruction to the energy managing system to enable the energy managing system to control the power conversion system in one manner of a group consisting of:

controlling, by the energy managing system, the operating state of the power conversion system to switch from the maximum power discharging state to an optimal power discharging state;

acquiring, by the energy managing system, the power conversion system failing to switch the operating state, and controlling the operating state of the power conversion system failing to switch the operating state from the charging state or the standby state or the discharging state to the maximum power discharging state; and maintaining, by the energy managing system, the operating state of the power conversion system unchanged.

9. The terminal according to claim 8, wherein the processor is further configured to:

receive a load recovery instruction sent by the master station; and send the load recovery instruction to the energy managing system to enable the energy managing system to control the power conversion system to switch from a current operating state to the charging state or the standby state or the discharging state.

10. A battery energy storage grid-load interactive system for superimposed control, comprising:

a battery energy storage grid-load interactive terminal, which comprises a processor and a memory for storing instructions executable by the processor, wherein the processor is configured to:

receive a load shedding instruction sent by a master station, send the load shedding instruction to the power conversion system to enable the power conversion system to switch an operating state of the power conversion system from a charging state or a standby state or a discharging state to a maximum power discharging state according to the load shedding instruction, and send the load shedding instruction to the energy managing system to enable the energy managing system to control the power conversion system in one manner of a group consisting of:

controlling, by the energy managing system, the operating state of the power conversion system to switch from the maximum power discharging state to an optimal power discharging state;

acquiring, by the energy managing system, the power conversion system failing to switch the operating state, and controlling the operating state of the power conversion system failing to switch the operating state from the charging state or the standby state or the discharging state to the maximum power discharging state; and maintaining, by the energy managing system, the operating state of the power conversion system unchanged; and a battery energy storage system, which comprises an energy managing system, at least one power conversion system, at least one battery managing system in one-to-one correspondence to the power conversion system, and a battery pack.

11. The system according to claim 10, wherein the processor of the battery energy storage grid-load interactive terminal is further configured to:

receive a load recovery instruction sent by the master station; and send the load recovery instruction to the energy managing system to enable the energy managing system to control the power conversion system to switch from a current operating state to the charging state or the standby state or the discharging state.

* * * * *